(12) United States Patent
Back et al.

(10) Patent No.: US 12,343,730 B2
(45) Date of Patent: Jul. 1, 2025

(54) MINCING MACHINE

(71) Applicants: Lumbeck & Wolter GmbH & Co. KG, Wuppertal (DE); Maschinenfabrik Seydelmann KG

(72) Inventors: Udo Back, Münnerstadt/Reichenbach (DE); Fabian Döring, Wuppertal (DE); Johannes Wamsler, Baden-Württemberg (DE)

(73) Assignees: Lumbeck & Wolter GmbH & Co. KG, Wuppertal (DE); Maschinenfabrik Seydelmann KG, Stuttgart Baden-Württemberg (DE)

( * ) Notice: Subject to any disclaimer, the term of this patent is extended or adjusted under 35 U.S.C. 154(b) by 359 days.

(21) Appl. No.: 18/043,580

(22) PCT Filed: Sep. 1, 2021

(86) PCT No.: PCT/EP2021/074109
§ 371 (c)(1),
(2) Date: Mar. 1, 2023

(87) PCT Pub. No.: WO2022/049111
PCT Pub. Date: Mar. 10, 2022

(65) Prior Publication Data
US 2023/0321667 A1    Oct. 12, 2023

(30) Foreign Application Priority Data
Sep. 2, 2020   (DE) .................... 20 2020 105 051.6

(51) Int. Cl.
*B02C 18/30*   (2006.01)
*A22C 17/00*   (2006.01)
(52) U.S. Cl.
CPC .......... *B02C 18/302* (2013.01); *B02C 18/305* (2013.01); *A22C 17/0026* (2013.01)

(58) Field of Classification Search
CPC ........... B02C 18/30–38; A22C 17/0026; F16D 2001/062
See application file for complete search history.

(56) References Cited

U.S. PATENT DOCUMENTS

RE21,817 E * 6/1941 Gronich .................. B02C 18/38
                                                    241/82.6
4,004,742 A    1/1977 Hess
(Continued)

FOREIGN PATENT DOCUMENTS

CN    208436993 U    1/2019
DE       809769       8/1951
(Continued)

OTHER PUBLICATIONS

Written Opinion in application No. PCT/EP2021/074109, mailing date Jan. 3, 2022.
(Continued)

*Primary Examiner* — Jared O Brown
(74) *Attorney, Agent, or Firm* — Oppedahl Patent Law Firm LLC

(57) ABSTRACT

A meat grinder having a screw conveyor, a blade journal mounted on the screw conveyor in a rotationally fixed manner, and a cutting set. The cutting set includes a perforated disc which is supported in a stationary manner in the meat grinder housing and a blade which is mounted in a rotationally fixed manner on a supporting portion of a blade journal. The blade journal is inserted in a bearing bore of the screw conveyor. An insertion end of the blade journal protrudes from the supporting portion in a radial direction, and a stop surface is located between the insertion end and a circumferential side of the supporting portion. A fastening ring is pushed over the supporting portion of the blade journal to the stop surface and can be connected to the screw (Continued)

conveyor, thereby achieving a detachable connection of the blade journal with the screw conveyor.

17 Claims, 1 Drawing Sheet

(56) References Cited

U.S. PATENT DOCUMENTS

| | | | |
|---|---|---|---|
| 4,018,390 A | 4/1977 | Funakubo | |
| 4,844,372 A * | 7/1989 | Weiler | B02C 18/304 |
| | | | 241/82.5 |
| 6,168,101 B1 * | 1/2001 | Xie | B02C 18/302 |
| | | | 241/82.5 |
| 9,162,230 B2 * | 10/2015 | Wight | B02C 18/365 |
| 9,539,580 B2 * | 1/2017 | Metcalf | B02C 18/302 |
| 9,750,264 B2 * | 9/2017 | Metcalf | B02C 18/30 |
| 10,363,563 B2 * | 7/2019 | Norberg | B02C 18/305 |
| 2004/0021019 A1 | 2/2004 | Gaartz | |

FOREIGN PATENT DOCUMENTS

| | | |
|---|---|---|
| DE | 2649305 | 8/1977 |
| DE | 8032323 U1 | 3/1981 |
| DE | 10026825 C2 | 10/2002 |
| DE | 202020102505 U1 | 5/2020 |

OTHER PUBLICATIONS

International Search Report in application No. PCT/EP2021/074109, mailing date Jan. 3, 2022.

* cited by examiner

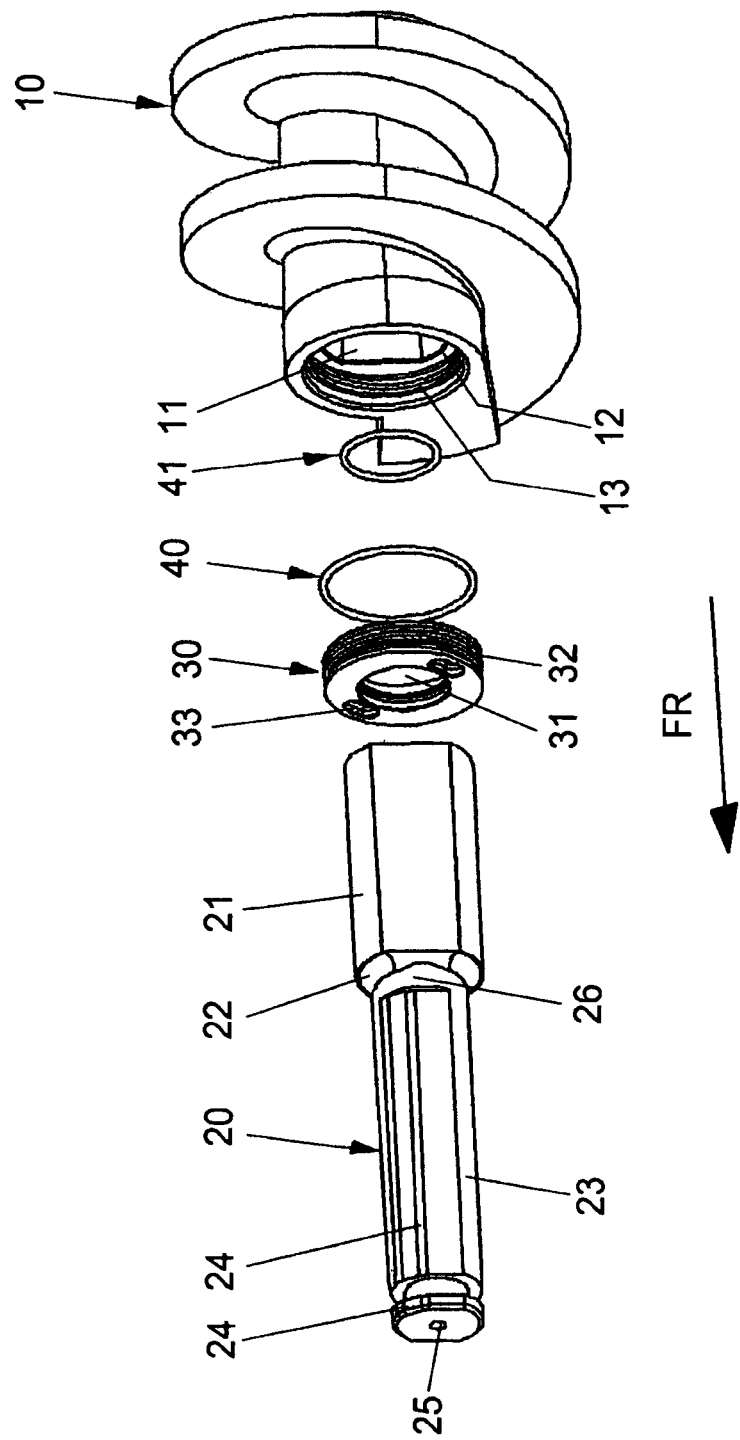

MINCING MACHINE

BACKGROUND

The invention relates to a meat grinder having cutting elements and having a screw conveyor which is rotatably mounted in a housing and which is connected to a blade journal. The various cutting elements include, for example, a perforated disc, a blade and/or a pre-cutter.

In the case of a known meat grinder, the blade journal is connected to the screw conveyor at one end in a rotationally fixed manner and, starting from the connection point with the screw conveyor, has an axially extending support section on which the blades are mounted in a rotationally fixed manner. In this way, it is ensured that, during one revolution of the screw conveyor, the blades rotate at the same rotational speed. The perforated discs adjacent to the blades are supported in a stationary way on the meat grinder housing and have a central hub, through which the blade journal passes. Known blade journals have different cross-sections, for example according to DE 26 49 305 C3 and U.S. Pat. No. 4,018,390 A, the blade journal has a supporting section for the blade in square form, and according to DE 20 202 0 102 505 U1 a supporting section in the form of a two-flat with a bevel on an edge for coding. Furthermore, it is known from DE 809 769 B to use a blade journal having a cross-section in the form of an asymmetrical polygon.

From the prior art, namely documents DE 26 49 305 C3, DE 20 202 0 102 505 U1 and U.S. Pat. No. 4,018,390 A, it is known to provide a releasable connection between the screw conveyor and the blade journal. The releasable connection shown in those documents is a screw connection which has the advantage that cutting elements and blade journals can be exchanged. In those documents, the blade journal has an external thread section which is screwed into a threaded opening on the screw conveyor. In practice, however, it has been found that such a screw connection has the disadvantage that it can only be released poorly, or cannot be released at all, after a long period of use. The application of high torques when attempting to release the screw connection can lead to damage to the components. Moreover, in the case of a screwed-in blade journal, a reverse movement of the screw is not possible or is only possible to a limited extent. It is, however, desirable to be able to have reverse operation. Thus, during the mixing process in the meat grinder, the material can be fed from the screw to the funnel, without this possibility of unmixing the material in the screw trains. Even when frozen meat is used in a meat grinder, a short-term reverse travel before a planned interruption has advantages, since the cutting set is thereby free and cannot freeze during the standstill. This minimizes the risk of breakage of a cutting element when the meat grinder is restarted.

Other connections between the screw conveyor and the blade journal are shown in document DE 100 26 825 C2, namely a feather key groove connection or in the document DE 80 32 323 U1, namely a press connection. These connections also allow easy assembly of the blade journal, but are no longer releasable after long use.

The object of the present invention is to provide a meat grinder with a drivable screw conveyor, in which the blade journal can be easily connected to the screw conveyor and can also be easily detached again. During the operation of the meat grinder, it should be ensured that a transfer of the torque of the screw conveyor to the blade journal and thus to the blades is ensured.

SUMMARY OF THE INVENTION

This object is achieved with a meat grinder having the features of the appended claims.

This meat grinder has, in a known manner, a conveyor screw which is mounted in the meat grinder housing and can be driven, in particular, via an electric motor. A blade journal is mounted in a rotationally fixed manner on this conveyor screw and is releasably held at one of its ends on the screw conveyor. The meat grinder further comprises at least one cutting set, wherein a cutting set can comprise different cutting elements. Such cutting elements are, for example, perforated disks and pre-cutters supported in a stationary manner on the meat grinder housing. Such cutting elements furthermore comprise blades which are mounted in a rotationally fixed manner on a supporting section of the blade journal and interact with adjacent perforated discs for grinding the meat. It is novel that the blade journal is inserted with its one end, termed the insertion end, into a bearing bore of the screw conveyor. In order to ensure a transfer of torque from the screw conveyor to the blade journal, the insertion end of the blade journal is adapted to the shape of the bearing bore.

In one embodiment, the blade journal has a constant cross-sectional shape along its axis, in the conveying direction. However, the cross-section of the support section of the blade journal and of the connecting section with the screw conveyor at the insertion end of the blade journal can be any polygonal cross-section, for example a so-called two-flat with two transfer surfaces for the torque arranged parallel to one another.

The cross-sectional shape of the blade journal at its support section, and the cross-sectional shape of the blade journal at its connecting section at the insertion end of the blade journal, can be the same or different.

In one embodiment, the insertion end of the blade journal and the support portion of the blade journal have the same cross-sectional shape. However, the insertion end has a larger circumference than the supporting portion on which the blades are mounted. The insertion end projects beyond the support section in the radial direction. Due to the larger cross-section at the insertion end, a stop surface is formed on the circumferential side in the transition region between the insertion end and the supporting portion. This stop surface serves as a stop for a fastening ring. This fastening ring has a correspondingly large opening, so that it can be pushed, on the one hand, from the downstream of the carrying section to this stop face. This opening of the fastening ring is large enough so that it can rotate freely on the supporting portion of the blade journal. On the other hand, the opening of the fastening ring is small enough that the fastening ring does not fit over the insertion end of the blade journal.

In a further embodiment, the support section of the blade journal and the insertion end of the blade journal have a different cross-sectional shape. In a further embodiment, the supporting section of the blade journal and the insertion end of the blade journal have the same cross-sectional shapes, but in a radially offset arrangement, so that the insertion end forms the supporting section at least at a plurality of circumferential points or at least at a plurality of circumferential points in the transition region between the insertion end and the supporting portion, while one or more stop surfaces for the separate fastening ring are produced on the circumferential side.

During assembly, the blade journal is inserted with the insertion end into the bearing bore of the screw conveyor. The fastening ring, which is pushed onto the blade journal and bears against the stop surface of the blade journal, is then connected to the screw conveyor. This connection is a detachable connection, wherein the fastening ring and the conveying screw have matching connecting means. A force-fit and/or form-fit connection, for example a screw connection, is preferred.

In a preferred embodiment, the fastening ring has an external thread on its circumferential surface and the screw conveyor has a matching internal thread. For this purpose, a cylindrical bushing with a corresponding internal thread is provided at the outlet-side end in front of the bearing bore in the screw conveyor. In this embodiment, the fastening ring is likewise pushed over the supporting portion up to the stop surface and the insertion end of the blade journal is inserted into the bearing bore. Since the opening of the mounting ring is smaller than the diameter at the insertion end, the blade journal is held axially in position by the screw connection between the fastening ring and the screw conveyor. The mounting of the blade journal on the screw conveyor is possible in a simple manner. The transfer of torque between the screw conveyor and the blade journal is ensured via the coordinated cross-sections of the insertion end and the bearing bore.

In an advantageous manner, such a blade journal is easier to detach from the screw conveyor than known blade journals. In the disassembly of the blade journal, damage to the blade journal is avoided, in particular, since the forces for releasing the screw connection act exclusively on the fastening ring. To facilitate the release of the screw connection, in an advantageous embodiment, grooves are provided on the fastening ring, which offer engagement possibilities for suitable tools when the screw connection is to be released.

In a further embodiment, the fastening ring has a circumferential rib on its circumferential surface which interacts with an annular groove in the cylindrical bushing at the outlet-side end in front of the bearing bore in the screw conveyor. Other force-fitting and/or form-fitting connections for connecting the fastening ring can also be used, such as, for example, hooking. Bayonet closures such as are known from the fastening of a lens to a camera can also be used, namely by providing noses on the fastening ring and corresponding recesses in the cylindrical bushing.

In addition, in the connection between the blade journal and the screw conveyor, a seal can be provided by means of sealing rings in order to prevent the penetration of ground material into the region of the screw connection and the bearing bore. The new meat grinder has in a known manner a driveable screw conveyor and has a blade journal a torsionally mounted on the screw conveyor, and the blade journal can be advantageously connected to the screw conveyor by means of a fastening ring. This connection can be easily released in the same way, wherein damage to the blade journal is avoided when the connection is released. In addition, in this connection of the blade journal with the screw conveyor, a reverse rotation of the screw is advantageously possible.

DESCRIPTION OF THE DRAWING

The invention is explained in more detail below on the basis of an exemplary embodiment with reference to the drawing.

FIG. 1 shows the apparatus according to the invention.

DETAILED DESCRIPTION

For better clarity, FIG. 1 shows only the parts of the meat grinder to which the new invention relates. Shown in a perspective view are the screw conveyor 10, the blade journal 20 and the fastening ring 30 used for connecting the blade journal 20 to the screw conveyor 10. In addition, two sealing rings 40, 41 are provided in this exemplary embodiment. FIG. 1 shows the conveying direction FR of the material to be ground in the meat grinder.

As seen in the conveying direction FR, the blade journal 20 has a front insertion end 21, a transition region 26 and a carrying portion 23 on which blades can be arranged in a rotationally fixed manner. The screw conveyor 10 has a bearing bore 11 for the insertion end 21 of the blade journal 20. The cross section of this bearing bore 11 is adapted to the cross section of the insertion end 21 serving as a connecting section. In this example, it is a two-flat form with two straight side surfaces, which are arranged parallel to one another both at the insertion end 21 of the blade journal 20 and in the bearing bore 11 of the screw conveyor 10. These straight side surfaces of the insertion end 21 serve for torque transmission and are each connected to one another via an outwardly curved side surface. In this example, the support section 23 also has the shape of a two-dimensional section. The coordinated cross-sections of the inserting end 21 and the bearing bushing 11 as well as the support section 23 and the recess in the blade ensure that when the screw conveyor 10 rotates, the blade journal 20 and also the blade is rotated. The blade is not shown here. In such a rotation, the blade journal 20 is held axially in position by means of the fastening ring 30.

Prior to the assembly of the blade journal 20, the fastening ring 30 is placed on the blade journal by the downstream end of the blade journal 20, with "downstream" defined according to the conveying direction FR. The fastening ring 30 is pushed along the supporting portion 23 of the blade journal 20, against the conveying direction FR, to the transition region 26, where it comes to rest with its front side against a stop surface 22, since the opening 31 of the fastening ring 30 is smaller than the cross-section of the insertion end 21 of the blade journal 20. The transition region 26 between the insertion end 21 and the supporting portion 23 of the blade journal 20 has a round cross-section. The diameter of the transition region 26 is adapted to the diameter of the opening 31 of the fastening ring 30, so that the fastening ring 30 can rotate about rotation of blade journal 20.

For assembly, the blade journal 20 is inserted with its insertion end 21 into the bearing bore 11 and the fastening ring 30 bearing on the transition region 26 is connected to the screw conveyor 10. For this purpose, the screw conveyor 10 has, in front of the bearing bore 11, a cylindrical bushing with an internal thread 13. This internal thread 13 cooperates with an external thread 32 on the circumferential surface of the fastening ring 30. The screw connection between the fastening ring 30 and the screw conveyor 10 simultaneously establishes a connection between the blade journal 20 and the screw conveyor 10. When the blade journal 20 is mounted, the latter carries the blades of the meat grinder in the supporting section 23 and ensures a rotationally fixed connection to these blades that, when the screw conveyor 10 is rotated, the latter move with it.

In this embodiment, the interior of the screw conveyor can be sealed by sealing rings 40, 41. The interior of the screw conveyor 10 is sealed with respect to the grinding chamber of the meat grinder and thus against penetration of ground material. The sealing ring 40 is preferably received in an annular groove in the interior of the fastening ring 30.

After the insertion of the blade journal 20 and screwing the fastening ring 30 into the cylindrical bushing of the screw conveyor 10, the blade journal 20 is held axially fixedly on the screw conveyor 10 and is connected to the latter in a rotationally fixed manner. A loosening of this screw connection is possible without damaging the blade journal 20, since no torque is exerted on the blade journal 20 when the fastening ring 30 is released. For the provision of the screw connection, but in particular also for releasing the screw connection, grooves 33 are additionally formed into the a face of the fastening ring 30 that faces downstream relative to the conveying direction FR. A corresponding auxiliary tool can engage in these grooves 33 in order to apply a rotation for releasing the screw connection.

In this exemplary embodiment, the releasable connection between the fastening ring 30 and the screw conveyor 10 is a screw connection. In other exemplary embodiments of the invention, other known force- and/or form-fitting connections are provided.

LIST OF REFERENCE SIGNS

- 10 Screw conveyor
- 11 Bearing bore
- 12 Contact surface
- 13 Internal thread
- 20 Blade journal
- 21 Insertion end
- 22 Stop surface
- 23 Support section
- 24 Coding element
- 25 axial bore
- 30 Fastening ring
- 31 Opening
- 32 External thread
- 33 groove
- 35 edge
- FR Conveying direction

The invention claimed is:

1. A meat grinder comprising:
a meat grinder housing, a driveable screw conveyor (10), and a blade journal (20) mounted in a rotationally fixed manner on the screw conveyor (10) and having at least one cutting set,
wherein the at least one cutting set comprises at least one perforated disc which is supported in a stationary manner on the meat grinder housing and a blade which is mounted in a rotationally fixed manner on a supporting portion (23) of the blade journal (20), the blade journal having an insertion end (21), the insertion end having a cross-section,
wherein the blade journal (20) is releasably held at one end on the screw conveyor (10),
characterized in that:
the blade journal (20) is inserted in a bearing bore (11) of the screw conveyor (10), the bearing bore having a cross-section, wherein the cross-section of the bearing bore (11) is adapted to the cross-section of the insertion end (21) of the blade journal (20),
the insertion end (21) of the blade journal (20) protrudes from the supporting portion (23) of the blade journal (20) in a radial direction and that a stop surface is provided in a transition area (26) between the insertion end (21) and a circumferential side of the supporting portion (23),
by means of a fastening ring (30), which can be pushed over the supporting portion (23) of the blade journal (20) to the stop surface (22) and can be connected to the screw conveyor (10), a detachable connection of the blade journal (20) with the screw conveyor (10) is achieved, wherein the fastening ring (30) and the screw conveyor (10) have matching fasteners configured to engage each other.

2. The meat grinder according to claim 1, characterized in that a releasable connection is provided between the fastening ring (30) and the screw conveyor (10) by means of a form-fitting connection or force-fitting connection or form-fitting and force-fitting connection.

3. The meat grinder according to claim 2, characterized in that a screw connection or a tongue-and-groove connection or a hooking or a bayonet connection, is present between the fastening ring (30) and the screw conveyor (10).

4. The meat grinder according to claim 1, characterized in that a diameter of an opening (31) in the fastening ring (30) is adapted to a diameter of the transition area (26) of the blade journal (20), and the diameter of the opening (31) in the fastening ring (30) is smaller than a diameter of the insertion end (21) of the blade journal (20).

5. The meat grinder according to claim 1, characterized in that first and second sealing rings (40, 41) are present in a connection region between the fastening ring (30) and the screw conveyor (10).

6. The meat grinder according to claim 5, characterized in that the first sealing ring (41), which is downstream in a conveying direction, is arranged at one end of a screw connection and the second sealing ring (40), which is upstream in the conveying direction, is arranged at another end of the screw connection.

7. The meat grinder according to claim 5, characterized in that the first sealing ring (41) bears against a stop surface (12) which limits the cylindrical bush to the front with the internal thread (11).

8. The meat grinder according to claim 1, characterized in that the fastening ring (30) has handling means.

9. The meat grinder according to claim 1, characterized in that the supporting section (23) of the blade journal (20) has a cross-sectional shape that is substantially the same as a cross-sectional shape of the insertion end (21) of the blade journal (20).

10. The meat grinder according to claim 1, characterized in that the supporting portion (23) of the blade journal (20) has a cross-sectional shape that is different than a cross-sectional shape of the insertion end (21) of the blade journal (20).

11. The meat grinder according to claim 1, characterized in that the insertion end (21) of the blade journal (20) projects beyond the supporting portion (23) of the blade journal (20) in the radial direction completely circumferentially or in portions circumferentially and in that one or more stop surfaces (22) are present in the transition area (26) between the insertion end (21) and the supporting portion (23).

12. The meat grinder according to claim 2, characterized in that a screw connection is present between the fastening ring (30) and the screw conveyor (10).

13. The meat grinder according to claim 12, characterized in that the fastening ring (30) has an external thread (32) on a circumferential surface and the screw conveyor (10) has a matching internal thread (13) at an outlet-side end in front of the bearing bore (11).

14. The meat grinder according to claim 8 wherein the handling means is in the form of grooves (33) or notches.

15. The meat grinder according to claim 9 wherein the cross-sectional shape is in the form of a two-flat.

16. An assembly method for use with a meat grinder comprising a meat grinder housing, a driveable screw conveyor (10), and a blade journal (20) mountable in a rotationally fixed manner on the screw conveyor (10) and having at least one cutting set, the meat grinder having a meat grinder housing, wherein the at least one cutting set comprises at least one perforated disc which is supportable in a stationary manner on the meat grinder housing and at least one blade which is mountable in a rotationally fixed manner on a supporting portion (23) of the blade journal (20), the blade journal having an insertion end (21), the insertion end having a cross-section, wherein the blade journal (20) is releasably holdable at one end on the screw conveyor (10), characterized in that the blade journal (20) is insertable into a bearing bore (11) of the screw conveyor (10), the bearing bore having a cross-section, wherein the cross-section of the bearing bore (11) is adapted to the cross-section of the insertion end (21) of the blade journal (20), characterized in that the insertion end (21) of the blade journal (20) protrudes from the supporting portion (23) of the blade journal (20) in a radial direction and that a stop surface is provided in a transition area (26) between the insertion end (21) and a circumferential side of the supporting portion (23), that by means of a fastening ring (30), which is pushable over the supporting portion (23) of the blade journal (20) to the stop surface (22), and can be connected to the screw conveyor (10), wherein the fastening ring (30) and the screw conveyor (10) have matching fasteners configured to engage each other, the method comprising the steps of:
- inserting the insertion end of the blade journal into the bearing bore of the screw conveyor;
- sliding a fastening ring over the supporting portion of the blade journal;
- fastening the fastening ring to the screw conveyor by means of the matching fasteners thereof, whereby a detachable connection of the blade journal (20) with the screw conveyor (10) is achieved;
- sliding the at least one perforated disc and the at least one blade onto the supporting portion of the blade journal, whereby the at least one blade is mounted in a rotationally fixed manner on the supporting portion of the blade journal;
- placing the blade journal and the screw conveyor and the fastening ring and the at least one perforated disc and the at least one blade into the meat grinder housing;
- supporting the at least one perforated disc in a stationary manner on the meat grinder housing.

17. A disassembly method for use with a meat grinder comprising a meat grinder housing, a driveable screw conveyor (10), and a blade journal (20) mountable in a rotationally fixed manner on the screw conveyor (10) and having at least one cutting set, the meat grinder having a meat grinder housing, wherein the at least one cutting set comprises at least one perforated disc which is supportable in a stationary manner on the meat grinder housing and at least one blade which is mountable in a rotationally fixed manner on a supporting portion (23) of the blade journal (20), the blade journal having an insertion end (21), the insertion end having a cross-section, wherein the blade journal (20) is releasably holdable at one end on the screw conveyor (10), characterized in that the blade journal (20) is insertable into a bearing bore (11) of the screw conveyor (10), the bearing bore having a cross-section, wherein the cross-section of the bearing bore (11) is adapted to the cross-section of the insertion end (21) of the blade journal (20), characterized in that the insertion end (21) of the blade journal (20) protrudes from the supporting portion (23) of the blade journal (20) in a radial direction and that a stop surface is provided in a transition area (26) between the insertion end (21) and a circumferential side of the supporting portion (23), that by means of a fastening ring (30), which is pushable over the supporting portion (23) of the blade journal (20) to the stop surface (22), and can be connected to the screw conveyor (10), wherein the fastening ring (30) and the screw conveyor (10) have matching fasteners configured to engage each other, the method comprising the steps of:
- removing the blade journal and the screw conveyor and the fastening ring and the at least one perforated disc and the at least one blade from the meat grinder housing;
- sliding the at least one perforated disc and the at least one blade off of the supporting portion of the blade journal;
- unfastening the fastening ring from the screw conveyor;
- extracting the insertion end of the blade journal from the bearing bore of the screw conveyor, whereby the blade journal (20) and the screw conveyor (10) are detached from each;
- sliding the fastening ring off of the supporting portion of the blade journal.

* * * * *